United States Patent
Blon et al.

(10) Patent No.: US 9,197,361 B2
(45) Date of Patent: Nov. 24, 2015

(54) SENDING ARRANGEMENT AND METHOD FOR TRANSMITTING SIGNALS

(71) Applicant: SILICON LINE GMBH, Munich (DE)

(72) Inventors: Thomas Blon, Munich (DE); Florian Jansen, Munich (DE)

(73) Assignee: Silicon Line GmbH, Munich (DE)

( * ) Notice: Subject to any disclaimer, the term of this patent is extended or adjusted under 35 U.S.C. 154(b) by 0 days.

(21) Appl. No.: 14/181,468

(22) Filed: Feb. 14, 2014

(65) Prior Publication Data

US 2015/0043675 A1 Feb. 12, 2015

Related U.S. Application Data

(63) Continuation of application No. PCT/DE2012/200055, filed on Aug. 16, 2012.

(30) Foreign Application Priority Data

Aug. 16, 2011 (DE) .......................... 10 2011 052 765

(51) Int. Cl.
| | | |
|---|---|---|
| H04L 1/02 | (2006.01) | |
| H04L 1/00 | (2006.01) | |
| G06F 1/04 | (2006.01) | |
| H04L 25/02 | (2006.01) | |
| H04J 3/04 | (2006.01) | |
| H04J 3/06 | (2006.01) | |
| H04L 7/00 | (2006.01) | |
| H04L 7/10 | (2006.01) | |

(52) U.S. Cl.
CPC ................ *H04L 1/0041* (2013.01); *G06F 1/04* (2013.01); *H04L 25/0276* (2013.01); *H04J 3/047* (2013.01); *H04J 3/0685* (2013.01); *H04L 7/0008* (2013.01); *H04L 7/10* (2013.01)

(58) Field of Classification Search
USPC ................................... 375/295, 259, 299, 288
See application file for complete search history.

(56) References Cited

U.S. PATENT DOCUMENTS 7,587,537 B1 * 9/2009 Burney ........................... 710/71
2010/0316099 A1 12/2010 Sugita et al.

OTHER PUBLICATIONS

"SL83014 by Silicon Line GmbH", Mar. 3, 2011, URL:http/www.silicon-line.com/SL83014.htm, XP055057663.
"MIPI Alliance Specification for D-PHY", Sep. 22, 2009, URL:http//www.mipi.org/specifications/physical-layer.
P. Dartnell et al., "Serdes Framer Interface Level 5 (SFI-5): Implementation Agreement for 40Gb/s Interface for Physical Layer Devices (OIF-SFI5-01.01)", Optical Internetworking Forum (OIF). URL:http/www.oiforum.com/public/documents/OIF-SFI5-01.0.pdf.
International Search Report; PCT/DE2012/200054; Apr. 18, 2013.

* cited by examiner

*Primary Examiner* — Siu Lee
(74) *Attorney, Agent, or Firm* — Studebaker & Brackett PC

(57) ABSTRACT

On the basis
of single-ended signals based on logic levels, and
of differential, in particular common-mode-based, signals,
a transmission arrangement and a corresponding method are proposed, in which a serialized signal transmission is always performed in an error-free and stable manner.

13 Claims, 3 Drawing Sheets

SENDING ARRANGEMENT AND METHOD FOR TRANSMITTING SIGNALS

CROSS-REFERENCE TO RELATED APPLICATIONS

This application is a continuation of international (WO) patent application no. PCT/DE2012/200055, filed 16 Aug. 2012, which claims the priority of German (DE) patent application no. 10 2011 052 765.6, filed 16 Aug. 2011, the contents of each being hereby incorporated herein by reference.

FIELD OF THE INVENTION

The present invention relates to a transmission arrangement and to a method for transmitting both single-ended logic-level-based data signals and clock signals, and differential, in particular common-mode-based, data signals and clock signals.

BACKGROUND OF THE INVENTION

The bit transmission layer or physical layer (PHY) is the bottom layer in the O[pen]S[ystems]I[nterconnection] layer model, also called OSI reference model and denotes a layer model of the International Standards Organisation (ISO) which in turn serves as a design basis for communication protocols in computer networks.

The physical layer (PHY) is responsible for Combining, F[orward]E[rror]C[orrection], modulation, power control, spreading (C[ode]D[ivision]M[ultiple]A[ccess]) and the like and knows neither data nor applications, only zeros and ones. PHY makes logical channels (transport channels for U[niversal]M[obile]T[elecommunications]S[ystem]) available to the security layer (D[ata]L[ink]L[ayer]) above it, in particular to a partial layer called M[edia]A[ccess]C[ontrol] Layer.

In principle D-PHY provides a flexible, low-cost and quick serial interface for communication links between components within a mobile device.

As illustrated in FIG. 3A, in modern mobile phones a data source, for example an application processor, provides image data as D-PHY signals to the M[obile]I[ndustry]P[rocessor]I[nterface]-D[isplay]S[erial]I[nterface] for display on a connected data sink, for example on a connected display. Also, a data sink such as an application processor, can receive, via a MIPI-C[amera]S[erial]I[nterface], image data in D-PHY format from a connected data source, such as from a connected camera.

A DSI or DSI-2 or CSI or CSI-2 or CSI-3 based on the D-PHY protocol comprises up to four differential data lines and a differential clock line, which electrically connect the application processor by means of a copper cable with the display and/or with the camera. The data rate per differential data line is up to 1.5 Gbps (Gigabit per second).

This conventional sending and receiving of the D-PHY-DSI signals or the D-PHY-CSI signals via one to four differential data signals and a differential clock line is illustrated by way of example in the D-PHY interface configuration of FIG. 3B by way of two data channels (=so called data lanes CH0+, CH0− and CH1+, CH1−) and a clock line (=so called clock lane CLK+, CLK−) between the modules of the master side (=data source, for example camera and/or application processor) and the modules of the slave side (=data sink, for example application processor and/or display unit).

In this context, as can be seen in FIG. 3A, up to ten copper lines are required for data transmission for each connected display or for each connected camera (for example four times two data lines and one time two clock lines).

In view of a desirable reduction in the number of lines consideration should be given to serialised signal transmission. Such serialisation is, however, conventionally prone to errors and frequently unstable.

OBJECTS AND SUMMARY OF THE INVENTION

Starting from the above-explained disadvantages and inadequacies as well as taking the outlined prior art into account the object of the present invention is to further develop a transmission arrangement of the above-mentioned type and a method of the above-mentioned type in such a way that a serialised signal transmission is always performed in an error-free and stable manner.

This object is achieved by a transmission arrangement according to the invention with the herein described features and by a method according to the invention with the herein described features. Advantageous embodiments and expedient developments of the present invention are described above and below.

This object is achieved by a transmission arrangement, to which can be applied:
data signals transportable on at least one data line, wherein on each of the data lines both
single-ended logic-level-based data signals, and
differential, in particular common-mode-based, data signals are present, and
clock signals transportable on at least one clock line, wherein on each of the clock lines both
single-ended logic-level based clock signals, and
differential, in particular common-mode-based, clock signals are present,
wherein the transmission arrangement serialises the single-ended, logic-level-based data and clock signals and the differential data and clock signals to form a common signal stream and
wherein the transmission arrangement comprises:
at least one clock generator for generating at least one reference clock on at least one clock line,
at least one serialiser downstream of the clock generator, which can be acted upon by a stop state detectable on the clock line and inserts into the common signal current at least one stop sequence assigned to a stop state, due to which stop state can be detected, for at least one receiving arrangement, that the transmission of the common signal stream can be switched off after expiry of at least one defined time interval, and
at least one detection/control means upstream of the clock generator for detecting the stop state on the clock line and for forwarding with a time delay at least one switch-off signal assigned to the stop state to the clock generator, by means of which switch-off signal the clock generator and the serialiser can be switched into the idle state.

This object is further achieved by an embodiment of the transmission arrangement according to the invention, wherein the transmission arrangement is assigned to at least one data source, configured
in particular as at least one camera and/or
in particular as at least one application processor.

This object is further achieved by an embodiment of the transmission arrangement according to the invention, wherein the receiving arrangement is assigned to at least one data sink, configured in particular as at least one application processor and/or in particular as at least one display unit.

This object is further achieved by an embodiment of the transmission arrangement according to the invention, wherein the clock generator is configured as at least one phase-locked-loop, in particular as at least one clock multiplier unit.

This object is further achieved by an embodiment of the transmission arrangement according to the invention, wherein the serialiser comprises
- at least one framer for generating at least one frame recognisable in the receiving arrangement for the common signal current as well as
- at least one multiplexer downstream of the framer for generating the common signal stream.

This object is further achieved by an embodiment of the transmission arrangement according to the invention, wherein both the single-ended, logic-level-based data signals and the differential data signals can be applied to the framer and in that the framer, by means of at least one coder, in particular by means of at least one 5b/6b coder block, embeds the differential data signals in the stream of the single-ended, logic-level-based data signals.

This object is further achieved by an embodiment of the transmission arrangement according to the invention, wherein the detection/control means is configured as at least one power-down controller.

This object is further achieved by an embodiment of the transmission arrangement according to the invention, wherein the serialiser and the detection/control means have at least one transmission interface logic assigned to at least one, for example, up to four bit wide CSI and/ CSI-2 and/or CSI-3 and/or DSI and/or DSI-2 interface of the data source, arranged upstream of them assigned for picking up the data signals and clock signals.

This object is further achieved by an embodiment of the transmission arrangement according to the invention, wherein the transmission interface logic comprises at least one state machine for correctly interpreting the data signals and/or for differentiating between H[igh]S[peed] data signals and L[ow]S[peed] data signals.

This object is achieved by a circuit arrangement comprising
- at least one transmission arrangement according to the invention as well as
- the at least one receiving arrangement.

This object is achieved by a method, wherein
- at least one transmission arrangement has applied to it:
- data signals transportable on at least one data line, wherein on each of the data lines both
- single-ended logic-level-based data signals, and
- differential, in particular common-mode-based, data signals are present, and
- clock signals transportable on at least one clock line, wherein on each of the clock lines both
- single-ended logic-level-based clock signals, and
- differential, in particular common-mode-based, clock signals are present,
- at least one reference clock is generated by means of at least one clock generator on at least one clock line,
- a stop state on the clock line is detected by means of at least one detection control means upstream of the clock generator,
- at least one switch-off signal assigned to the stop state is forwarded with a time delay by means of the detection control means to the clock generator by means of which switch-off signal the clock generator and at least one serialiser downstream of the clock generator are switched into the idle state, and
- the serialiser is acted upon by the stop state detected on the clock line and inserts into the common signal stream to be transmitted to at least one receiving arrangement at least one stop sequence assigned to the stop state, due to which stop sequence the receiving arrangement detects that the transmission is switched off after the defined time interval has expired.

This object is further achieved by an embodiment of the method according to the invention, wherein the defined time interval is assigned to the time delay of the switch-off signal.

This object is further achieved by an embodiment of the method according to the invention, wherein the defined time interval corresponds to roughly at least the time delay of the switch-off signal.

This object is further achieved by an embodiment of the method according to the invention, wherein the stop sequence is transmitted on at least one virtual telegram lane.

This object is further achieved by a use of the circuit arrangement and/or of the method according to the invention during at least one simultaneous serial and/or bundled, in particular CSI protocol-based and/or CSI-2 protocol-based and/or CSI-3 protocol-based and/or DSI protocol-based and/or DSI-2 protocol-based transmission of both single-ended logic-level-based data signals and clock signals and differential, in particular common-mode-based, data signals and clock signals, in particular D-PHY data signals and D-PHY clock signals, for example up to 4-bit-wide MIPI-D-PHY data signals and MIPI-D-PHY clock signals, between at least one data source, in particular at least one e.g. high-resolution camera acting e.g. as an image source and/or at least one application processor, and at least one data sink, in particular at least one application processor and/or at least one e.g. high-resolution display unit and/or a display unit acting e.g. as an image sink, for example at least one display or at least one monitor.

According to the invention a transmission arrangement is proposed, by means of which
- the single-ended L[ow]P[ower] data corresponding to signals based on logic levels and
- the differential H[igh]S[peed] data corresponding to signals based in particular on common mode signals are serialised to form a common signal stream. If for example one to four data channels are transmitted after being serialised, an error-free and stable transmission is possible, if and as long as a clock is applied to the serialisation element or the serialiser.

However, the clock provided by the data source is based on the assumption that data transmission is effected in parallel from the master side (=data source, for example camera and/or application processor) to the slave side (=data sink, for example application processor and/or display unit). Once parallel data transmission is completed, the master switches the clock off.

It has to be taken into account, however, that because of the serialisation/deserialisation process more time is required for serial data transmission than for corresponding parallel data transmission. If the clock were to be switched off by the master, for example by the camera or by the application processor before all necessary serialised data is transmitted and deserialised, this would lead to data losses and bit errors.

To ensure a consistently error-free and stable transmission of the common signal stream consisting of
- single-ended, logic-level-based data and clock signals as well as differential, in particular common-mode-based data and clock signals, there is, according to the invention, a delay before the serialised optical and/or electrical D-PHY connection is switched off, this in order to reliably avoid data losses and bit errors while serialising the differential data line and the differential clock line in particular of the D[isplay]S[erial]I[nterface] and/or the C[amera] S[erial]I[nterface].

Using the transmission arrangement and circuit technology described below it is possible, with the clock deactivated, to continue transporting the remaining part of the serialised common signal stream to the receiver or the so-called slave (=data sink, for example application process and/or display unit) and to notify it that the link or the connection is to be switched-off subsequently.

Consequently, according to the invention, a consistently error-free and stable switch-off of at least one serialised link, in particular at least one serialised D-PHY-D[isplay]S[erial] I[nterface] or D-PHY-C[amera]S[erial]I[nterface] link is realised.

The present invention further relates to at least one receiving arrangement, which, in particular taking into consideration the peculiarities of the D-PHY protocol, can receive at least one common signal stream serialised and/or bundled by means of the transmission arrangement according to the above-described type, in order to recover therefrom, in particular to debundle, the in particular up to four differential data lines and the differential clock line.

The present invention further relates to at least one circuit arrangement comprising
   at least one transmission arrangement according to the above-described type as well as
   at least one receiving arrangement according to the above-described type.

The present invention can be typically applied during at least a temporary stop of at least one simultaneous serial and/or bundled, in particular CSI-protocol-based and/or CSI-2-protocol-based and/or CSI-3-protocol-based and/or DSI-protocol-based and/or DSI-2-protocol-based transmission of both single-ended logic-level-based data signals and clock signals and differential, in particular common-mode-based data signals and clock signals, in particular D-PHY data signals or D-PHY clock signals, for example one-to-four-bit wide MIPI-D-PHY data signals and MIPI-D-PHY clock signals, between at least one data source, in particular at least for example a high-resolution camera and/or a camera acting as an image source and/or at least one application processor, and at least one data sink, in particular at least one application processor and/or at least one high-resolution display unit or a display unit acting for example as an image sink, for example at least one display or at least one monitor.

BRIEF DESCRIPTION OF THE DRAWINGS

As already discussed above, there are various possibilities for embodying and further developing the teaching of the present invention in an advantageous manner. For this purpose, on the one hand reference is made to the explanations above and to the dependent claims, and on the other hand further embodiments, features and advantages of the present invention are explained in greater detail below, inter alia by way of the exemplary embodiments illustrated by FIG. 1A to FIG. 2B.

It is shown in.

Like or similar embodiments, elements or features are provided with identical reference numerals in FIG. 1A to FIG. 3B.

DETAILED DESCRIPTION OF THE INVENTION

Figure 1A:
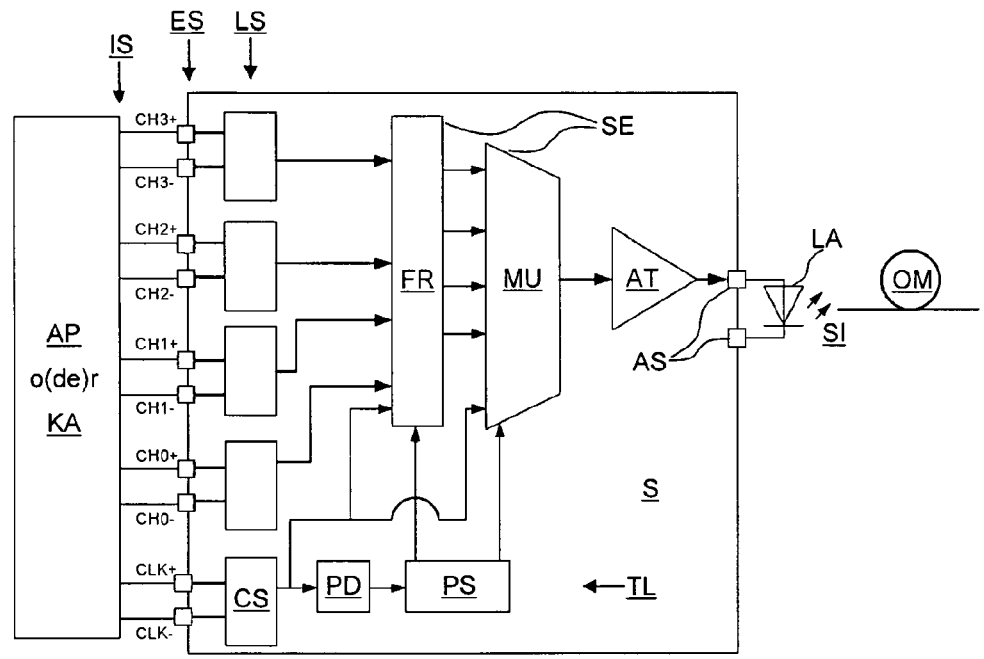
FIG. 1A in a conceptual schematic illustration an embodiment of the transmission arrangement according to the present invention, which operates according to the method of the present invention.
Figure 2A:
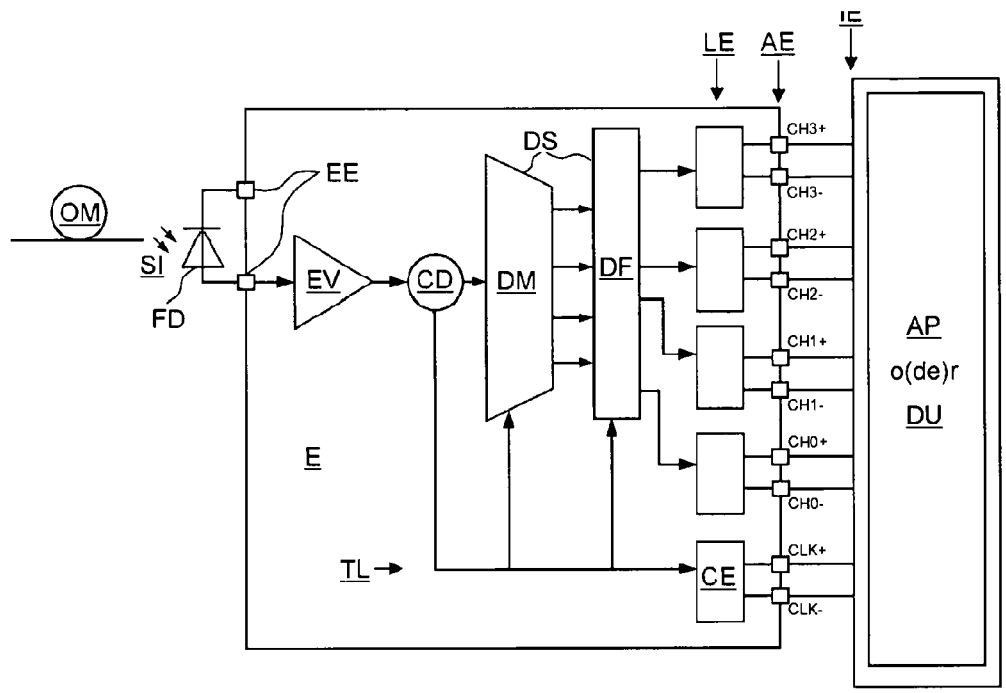
FIG. 2A in a conceptual schematic illustration an embodiment of the receiving arrangement associated with the transmission arrangement of FIG. 1A, which operates according to the method of the present invention.

In principle it is possible,
   by means of the embodiment shown in FIG. 1A of a transmission arrangement S according to the present invention and
   by means of an embodiment shown in FIG. 2A of a receiving arrangement E according to the present invention,
which results in a circuit arrangement S, E (see FIG. 1A, FIG. 2A) according to the present invention (in terms of the present invention, it is possible, to realise and to operate the transmission arrangement S and the receiving arrangement E independently of each other), to realise and to operate a cable-based link
   which has been multiplexed and thus serialised on an optical basis, in particular on the basis of at least one optical medium, for example on the basis of an optical waveguide OM (see detail illustrations in FIG. 1A, FIG. 2A), such as on the basis of at least one glass fibre and/or on the basis of at least one plastic fibre and/or
   which has not been multiplexed on an electrical or galvanic basis, in particular on the basis of at least one copper cable and/or on the basis of at least one electrical line such as arranged on at least a printed circuit board.

FIG. 1A shows an embodiment of the principal construction of a transmission arrangement S for connection to a D[isplay]S[erial]I[nterface] data transmission interface IS or a C[amera]S[erial]I[nterface]—data transmission interface IS.

The image data generated in the application processor AP or in the camera KA are made available on four data lines or channels CH0+, CH0−, CH1+, CH1−, CH2+, CH2−, CH3+, CH3− as D-PHY signals at the up-to-four-bit-wide data transmission interface IS together with the D-PHY correct clock signals CLK+, CLK−.

The transmission arrangement S picks these signals up at an integrated Interface Logic LS, the blocks of which can prove that they have at least one state machine for correct interpretation of the D-PHY signals and for differentiating between high-frequency data streams (so-called H[igh]S [peed] data) and low-frequency data streams (so-called L[ow] S[peed] data).

A framer FR following in the transmission arrangement S (see also detail view in FIG. 1B) ensures D[irect]C[urrent] balancing of the input signal and generates a frame recognisable on the receiving side (see FIG. 2A), which allows the receiving arrangement E (see FIG. 2A) to re-assign the received data to the correct output data lines or output channels CH0+, CH0−, CH1+, CH1−, CH2+, CH2−, CH3+, CH3−.

Figure 1B:
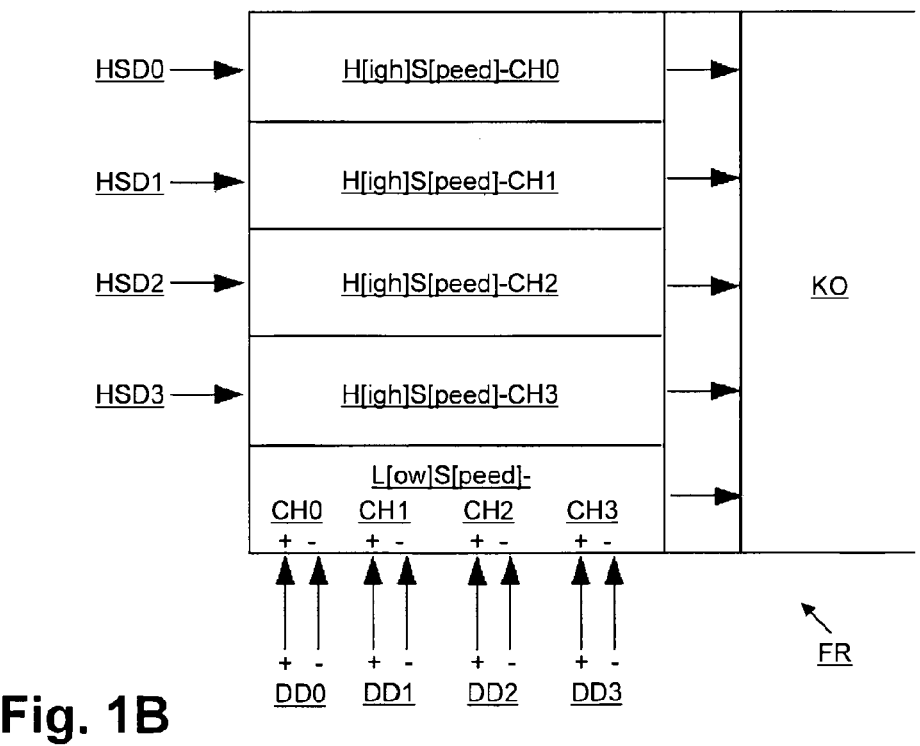
FIG. 1B in a conceptual schematic illustration a detail view of an embodiment of the framer of the transmission arrangement in FIG. 1A.

In detail both the logic-level-based single-ended data signals HSD0, HSD1, HSD2, HSD3 and the differential data signals DD0+, DD0−, DD1+, DD1−, DD2+, DD2−, DD3+, DD3−, DD3− can be applied to the framer FR according to FIG. 1B. By means of its coder KO configured as a 5b/6b coding block the framer according to FIG. 1B embeds these differential data signals DD0+, DD0−, DD1+, DD1−, DD2+, DD2−, DD3+, DD3− into the stream of the single-ended logic-level-based data signals HSD0, HSD1, HSD2, HSD3.

A multiplexer MU, in particular H[igh]S[peed] Mux, adjoining the frame FR, uses a clock generator PS configured as a phase-locked-loop, in particular as a C[lock]M[ultiplier] U[nit], to generate the high-frequency serial or bundled transmission signal, which is made available at the output AS of the transmission arrangement S by means of an output driver AT. The framer FR and the multiplexer MU together form the serialiser SE.

The D-PHY clock signal provided via the clock port CLK+, CLK− and via the clock module CS of the interface logic LS by means of clock generator PS is used as (clock) reference for the serialiser SE, in particular for its multiplexer MU, and is embedded into the serial data stream, i.e. into the serialised output signal. This creates the common signal stream SI which is communicated to the receiving arrangement E (see FIG. 2A).

As can further be seen in FIG. 1A, the output driver AT is implemented as an integrated laser driver for driving at least one directly connected laser LA, in particular for driving at least one V[ertical]C[avity]S[urface]E[mitting]L[aserdiode].

In order to ensure that the serialised and/or bundled transmission of D-PHY signals between the transmission arrangement S (see FIG. 1A) and the receiving arrangement E (see FIG. 2A) is performed consistently error-free and stable on the basis of the CSI and/or CSI-2 and/or CSI-3 and/or DSI and/or DSI-2 protocol, the D-PHY link is switched off with a delay, as soon as a so-called stop state is detected on the clock line TL, in particular on its clock input.

To this end a detection/control means PD configured as a power-down controller receives, among others, a detection of the stop state on the input clock line TL. This signal is forwarded with a delay to the internal clock generator PS.

The detection of the stop state is also applied to the serialiser SE composed of the framer FR and the multiplexer MU, whereupon the serialiser inserts a certain sequence into the serialised signal stream. Based on this sequence the receiver E (see FIG. 2A) is able to detect that the link is to be switched off after a certain time has expired.

The delayed switch-off signal then switches the internal clock generator PS and other blocks, such as the serialiser SE, into the idle state, after the system-relevant information was conveyed or transmitted for example on at least one virtual telegram lane, that the serial data link will shortly be cut.

FIG. 2A shows an embodiment for the principal construction of a receiving arrangement E for connection to a D[isplay]S[erial]I[nterface] data transmission interface IE or also a C[amera]S[erial]I[nterface] data transmission interface IE.

The serial or bundled data sent out by the transmission arrangement S (see FIG. 1A) is picked up via an input amplifier EV of the receiving arrangement E and supplied to an integrated clock or data recovery CD.

This integrated clock or data recovery CD regenerates the original D-PHY clock from the common signal stream SI, which is then made directly available again to the D[isplay]S[erial]I[nterface] or the C[amera]S[erial]I[nterface] via the clock module CE of the interface logic LE. The remaining serial data stream is debundled and parallelised via a demultiplexer DM and handed over to a deframer DF (see also detail in FIG. 2B), which in principle is the mirror image of framer FR according to FIG. 1B. The demultiplexer DM and deframer DF together form the deserialiser DS.

Figure 2B:
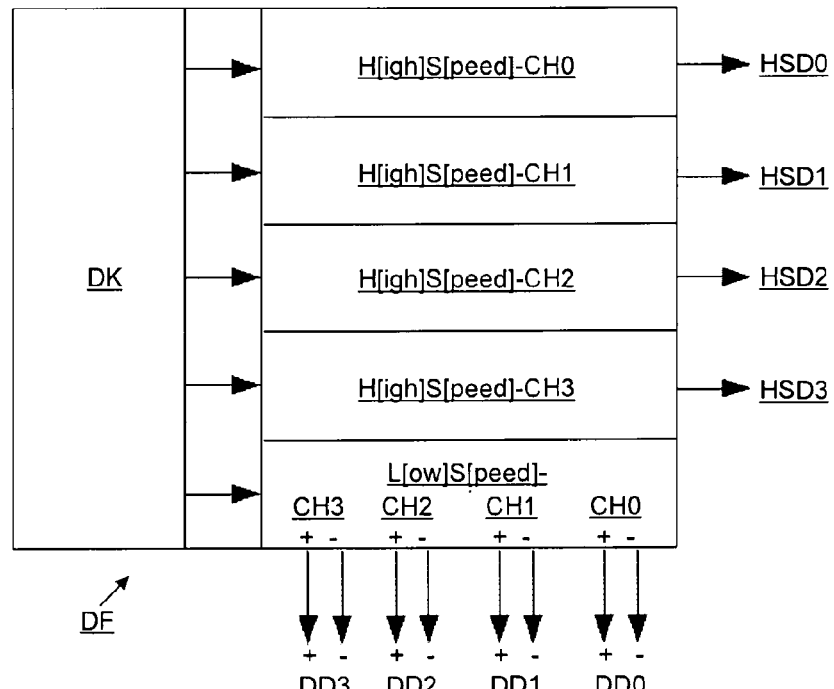
FIG. 2B in a conceptual schematic illustration a detail view of an embodiment of the deframer of the receiving arrangement of FIG. 2A.
Figure 3A:
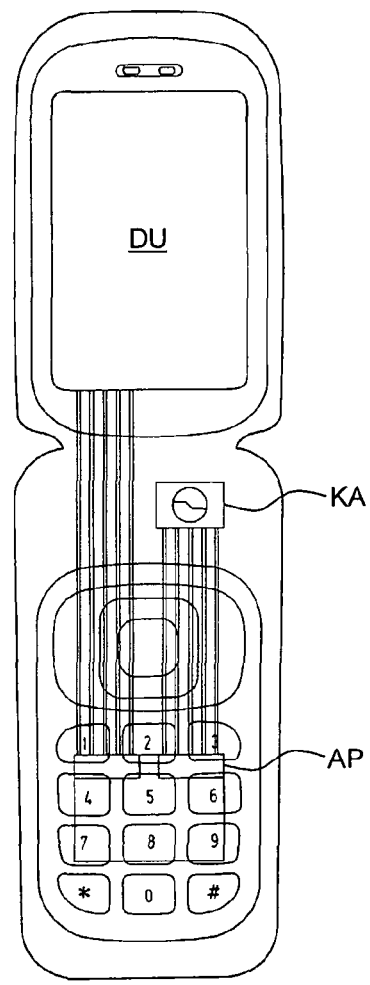
FIG. 3A in a conceptual schematic illustration a typical arrangement from the prior art.
Figure 3B:
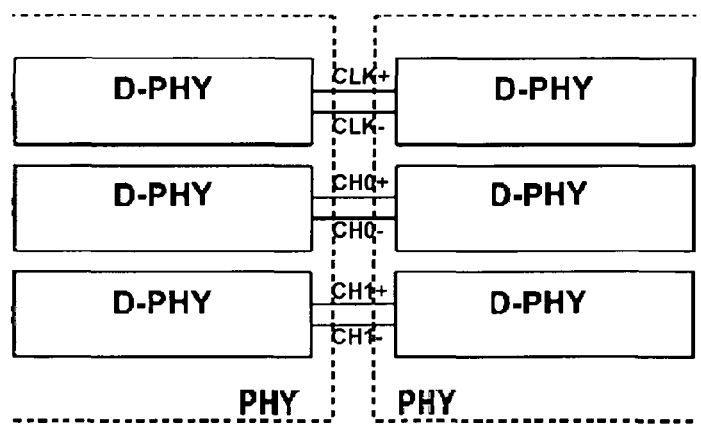
FIG. 3B in a conceptual schematic illustration an example of an interface configuration with two data channels and a clock line, on which the arrangement shown in FIG. 3A is based.

In detail the deframer FR according to FIG. 2B, by means of its decoder DK configured as a 6b/5b decoder block, can separate the differential data signals DD0+, DD0−, DD1+, DD1−, DD2+, DD2−, DD3+, DD3− from the single-ended, logic-level-based data signals HSD0, HSD1, HSD2, HSD3 and re-assign the reparallelised data signals to the respectively relevant data lines CH0+, CH0−, CH1+, CH1−, CH2+, CH2−, CH3+, CH3−.

The interface logic blocks LE shown in the receiving arrangement E may comprise at least one state machine respectively for correct interpretation of the D-PHY logic signals and for differentiating between high-frequency data streams and low-frequency data streams.

As can also be seen in the illustration in FIG. 2A, the input amplifier EV is implemented as an integrated transimpedance amplifier, which allows a photo diode FD to be directly connected to the receiving arrangement E.

In this way, with regard to the circuit arrangement S, E (see FIG. 1A, FIG. 2A), it is possible according to the invention to realise and to operate the cable-based multiplexed link between the transmission arrangement S (see FIG. 1A) and the receiving arrangement E (see FIG. 2A) on an optical basis, i.e. by means of an optical waveguide OM configured e.g. in form of a glass fibre and/or in form of a plastic fibre.

LIST OF REFERENCE NUMERALS

E receiving arrangement
S transmission arrangement
AE output of the receiving arrangement E
AP application processor
AS output of the transmission arrangement S
AT output driver, in particular laser driver
CD clock and data recovery unit
CE clock module of the receiving interface logic LE
CH0± first data line or first channel
CH1± second data line or second channel
CH2± third data line or third channel
CH3± fourth data line or fourth channel
CLK± clock line or clock channel
CS clock module of the transmitting interface logic LS
DD0± differential signal, in particular common-mode-based data signal on the first data line or the first channel CH0±
DD1± differential signal, in particular common-mode-based data signal on the second data line or the second channel CH1±
DD2± differential signal, in particular common-mode-based data signal on the third data line or the third channel CH2±
DD3± differential signal, in particular common-mode-based data signal on the fourth data line or the fourth channel CH3±
DF deframer
DK decoder, in particular 6b/5b-Decoderblock, of deframer DF
DM demultiplexer DS deserialisation element or deserialiser
DU display unit
EE input of the receiving arrangement E
ES input of the transmission arrangement S
EV input amplifier, in particular transimpedance amplifier
FD photo diode
FR framer
HSD0 single-ended logic-level-based data signal on the first data line or the first channel CH0±
HSD1 single-ended logic-level-based data signal on the second data line or the second channel CH1±
HSD2 single-ended logic-level-based data signal on the third data line or the third channel CH2±
HSD3 single-ended logic-level-based data signal on the fourth data line or the fourth channel CH3±
IE data-sink-related CSI and/or CSI-2 and/or CSI-3 and/or DSI and/or DSI-2 interface
IS data-source-related CSI and/or CSI-2 and/or CSI-3 and/or DSI and/or DSI-2 interface
KA camera
KO coder, in particular 5b/6 coder block of framer FR
LA laser
LE receiving interface logic
LS transmitting interface logic
MU multiplexer
OM optical medium, in particular optical waveguide, e.g. glass fibre and/or plastic fibre
PD detection/control means, in particular power-down controller
PS clock generator, in particular phase-locked-loop, for example clock multiplier unit
SE serialisation element or serialiser
SI common signal stream
TL clock line While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A transmission arrangement, to which can be applied:
   data signals transportable on at least one data line, wherein on each of the data lines both
   single-ended logic-level-based data signals, and
   differential data signals are present, and
   clock signals transportable on at least one clock line, wherein on each of the clock lines both
   single-ended logic-level based clock signals, and
   differential clock signals are present,
   wherein the transmission arrangement serializes the single-ended, logic-level-based data and clock signals and the differential data and clock signals to form a common signal stream and
   wherein the transmission arrangement comprises:
   at least one clock generator for generating at least one reference clock on at least one clock line,
   at least one serializer downstream of the clock generator, which can be acted upon by a stop state detectable on the clock line and inserts into the common signal stream at least one stop sequence assigned to a stop state, due to which stop state can be detected, for at least one receiving arrangement, that transmission of the common signal stream can be switched off after expiry of at least one defined time interval, and
   at least one power-down controller upstream of the clock generator for detecting the stop state on the clock line and for forwarding with a time delay at least one switch-off signal assigned to the stop state to the clock generator, by means of which switch-off signal the clock generator and the serializer can be switched into an idle state.

2. The transmission arrangement according to claim 1, wherein the transmission arrangement is assigned to at least one data source.

3. The transmission arrangement according to claim 1, wherein the receiving arrangement is assigned to at least one data sink.

4. The transmission arrangement according to claim 1, wherein the clock generator is configured as at least one phase-locked-loop.

5. The transmission arrangement according to claim 1, wherein the serializer comprises
   at least one framer for generating at least one frame recognizable in the receiving arrangement for the common signal stream as well as
   at least one multiplexer downstream of the framer for generating the common signal stream.

6. The circuit arrangement according to claim 5, wherein both the single-ended, logic-level-based data signals and the differential data signals can be applied to the framer and in that the framer, by means of at least one coder, embeds the differential data signals in the stream of the single-ended, logic-level-based data signals.

7. The transmission arrangement according to claim 1, wherein the serializer and the at least one power-down controller have at least one transmission interface logic assigned to at least one, for example, up to four bit wide CSI and/ CSI-2 and/or CSI-3 and/or DSI and/or DSI-2 interface of the data source, arranged upstream of them assigned for picking up the data signals and clock signals.

8. The transmission arrangement according to claim 7, wherein the transmission interface logic comprises at least one state machine for correctly interpreting the data signals and/or for differentiating between H[igh]S[peed] data signals and L[ow]S[peed] data signals.

9. A circuit arrangement comprising
   at least one transmission arrangement according to claim 1 as well as
   the at least one receiving arrangement.

10. A method, wherein
    at least one transmission arrangement has applied to it:
    data signals transportable on at least one data line, wherein on each of the data lines both
    single-ended logic-level-based data signals, and
    differential data signals are present, and
    clock signals transportable on at least one clock line, wherein on each of the clock lines both
    single-ended logic-level-based clock signals, and
    differential clock signals are present,
    at least one reference clock is generated by means of at least one clock generator on the at least one clock line,
    a stop state on the at least one clock line is detected by means of at least one power-down controller upstream of the clock generator,
    at least one switch-off signal assigned to the stop state is forwarded with a time delay by means of the at least one power-down controller to the clock generator by means of which switch-off signal the clock generator and at least one serializer downstream of the clock generator are switched into an idle state, and the serializer is acted upon by the stop state detected on the clock line and inserts into a common signal stream to be transmitted to at least one receiving arrangement at least one stop sequence assigned to the stop state, due to which stop sequence the receiving arrangement detects that transmission is switched off after the defined time interval has expired.

11. The method according to claim 10, wherein the defined time interval is assigned to the time delay of the switch-off signal.

12. The method according to claim 11, wherein the defined time interval corresponds to roughly at least the time delay of the switch-off signal.

13. The method according to claim 10, wherein the stop sequence is transmitted on at least one virtual telegram lane.

* * * * *